United States Patent [19]
Kluska et al.

[11] Patent Number: 6,096,973
[45] Date of Patent: Aug. 1, 2000

[54] AERIAL TERMINAL FOR PAIRED-CONDUCTOR AND COAXIAL-CABLE DROP WIRES

[75] Inventors: Theodore E. Kluska, Glen Rock, N.J.; Ronald Marchisin, Toby Hanna, Pa.; Peter Michaels, Randolph; Andrew Schwartz, Morisstown, both of N.J.; Anthony R. Tancreto, Brooklyn, N.Y.

[73] Assignee: Lucent Technologies Inc., Murray Hill, N.J.

[21] Appl. No.: 08/890,736

[22] Filed: Jul. 11, 1997

Related U.S. Application Data
[60] Provisional application No. 60/049,642, Jun. 16, 1997.

[51] Int. Cl.[7] .................................................. H01R 13/46
[52] U.S. Cl. ........................... 174/60; 174/40 R; 174/92; 174/36
[58] Field of Search ..................................... 174/92, 99 R, 174/97, 100, 40 R, 50, 65 G, 60, 70, 41, 36, 59

[56] References Cited

U.S. PATENT DOCUMENTS

| | | | |
|---|---|---|---|
| 1,680,940 | 8/1928 | Emmons | 174/70 |
| 2,683,304 | 7/1954 | Channell | 29/155 |
| 4,390,744 | 6/1983 | Suffi et al. | 174/41 |
| 4,414,426 | 11/1983 | Burtelson | 174/59 |
| 4,513,171 | 4/1985 | Suffi et al. | 174/41 |
| 4,694,118 | 9/1987 | Schmidt | 174/41 |
| 4,810,829 | 3/1989 | Rutenbeck et al. | 174/41 |
| 5,136,121 | 8/1992 | Kluska et al. | 174/93 |
| 5,247,135 | 9/1993 | Rebers et al. | 174/92 |
| 5,561,268 | 10/1996 | Dagan et al. | 174/92 |
| 5,563,372 | 10/1996 | Messelhi | 174/60 |
| 5,729,370 | 3/1998 | Bernstein et al. | 359/118 |
| 5,934,912 | 8/1999 | Morrell | 439/49 |

OTHER PUBLICATIONS

Olu Akiwumi–Assani et al, Multimedia Terminal Architecture, Phillips Electronic Research, vol. 50, Issue 1–2, pp. 169–184, 1996.

*Primary Examiner*—Kristine Kincaid
*Assistant Examiner*—William H. Mayo, III
*Attorney, Agent, or Firm*—Steve Mendelsohn

[57] ABSTRACT

The aerial terminal has a tray assembly having zero, one, or more holes for paired-conductor drop wires, as well as one or more converter holes for converters (e.g., baluns), each of which allows signals over an additional conductor pair to be converted and sent through a coaxial-cable drop wire. The tray assembly enables the aerial terminal to be used to distribute to customers both communication signals and broadband signals carried by a multi-wire distribution cable. In a preferred embodiment, the tray assembly of the present invention is designed to replace the grommet trays of prior-art Flexterm® 5000 Aerial Terminals by Lucent Technology, Inc., that are already in service, without disturbing any of the connections between the distribution cable and the terminal block of the existing aerial terminal.

28 Claims, 3 Drawing Sheets

6,096,973

AERIAL TERMINAL FOR PAIRED-CONDUCTOR AND COAXIAL-CABLE DROP WIRES

This nonprovisional U.S. national application, filed under 35 U.S.C. §111(a), claims, under 35 U.S.C. §119(e) (1), the benefit of the filing date of provisional U.S. application Ser. No. 60/049,642, filed under 35 U.S.C. §111(b) on Jun. 16, 1997 using Express Mail Label No.EI001914804US, the teachings of which are incorporated herein by reference.

BACKGROUND OF THE INVENTION

1. Field of the Invention

The present invention relates to telecommunications, and, in particular, to aerial terminals for distributing drop wires to customers from multi-wire distribution cables.

2. Description of the Related Art

A conventional aerial terminal is a terminal for distributing communication signals from a multi-wire cable to customers via conventional paired-conductor drop wires, such as twisted-pair drops, F-drops, or C rural drops. For purposes of this specification, the term "communication signals" covers telephony, video, data, and any other signal, included interactive signals, that can be carried over a conventional paired-conductor drop wire. An aerial terminal allows wires to be "broken out" of the distribution cable running through one chamber of the aerial terminal (i.e., the splice chamber) and spliced to stub wires extending from a terminal block that is typically housed within another chamber of the aerial terminal (i.e., the distribution chamber). Paired-conductor drop wires can then be terminated to the connector end of the terminal block and routed through holes in a grommet tray to the customer location. A conventional aerial terminal is described in U.S. Pat. No. 5,136,121, the teachings of which are incorporated herein by reference.

In the future, multi-wire distribution cables will be used to carry signals other than or in addition to communication signals. What is needed is the ability to distribute efficiently a variety of signals, including both communication signals and broadband signals, such as switched digital broadband (SDB) signals, from one or more distribution cables to customers.

SUMMARY OF THE INVENTION

Embodiments of the present invention are directed to an aerial terminal for distributing drop wires from at least one distribution cable, comprising (a) a splice chamber adapted to receive the distribution cable; (b) a terminal block adapted to receive one or more connections from the distribution cable; and (c) a tray assembly having zero, one, or more holes adapted to receive paired-conductor drop wires from the terminal block and one or more converter holes each adapted to receive a converter that allows signals over a twisted pair to be converted and sent through a coaxial-cable drop wire.

In alternative embodiments, the present invention is directed to a tray assembly for an aerial terminal for distributing drop wires from at least one distribution cable and having a splice chamber adapted to receive the distribution cable and a terminal block adapted to receive one or more connections from the distribution cable. The tray assembly has zero, one, or more holes adapted to receive paired-conductor drop wires from the terminal block and one or more converter holes each adapted to receive a converter that allows signals over a twisted pair to be converted and sent through a coaxial-cable drop wire.

In other alternative embodiments, the present invention is directed to an aerial terminal having at least one distribution ring connected to the bottom of the aerial terminal and adapted to retain one or more of sets of drop wires, wherein the distribution ring is wider at the bottom than at the top.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention is directed to an aerial terminal that provides distribution capabilities for a variety of signals, such as communication signals and broadband signals. The aerial terminal of the present invention is capable of distributing communication signals and broadband signals from a multi-wire distribution cable to individual customers. This signal distribution is enabled by a tray assembly that provides access to the terminal block of the aerial terminal for the paired-conductor drop wires used for communication signals as well as for the coaxial-cable drop wires used for broadband signals.

Figure 1:
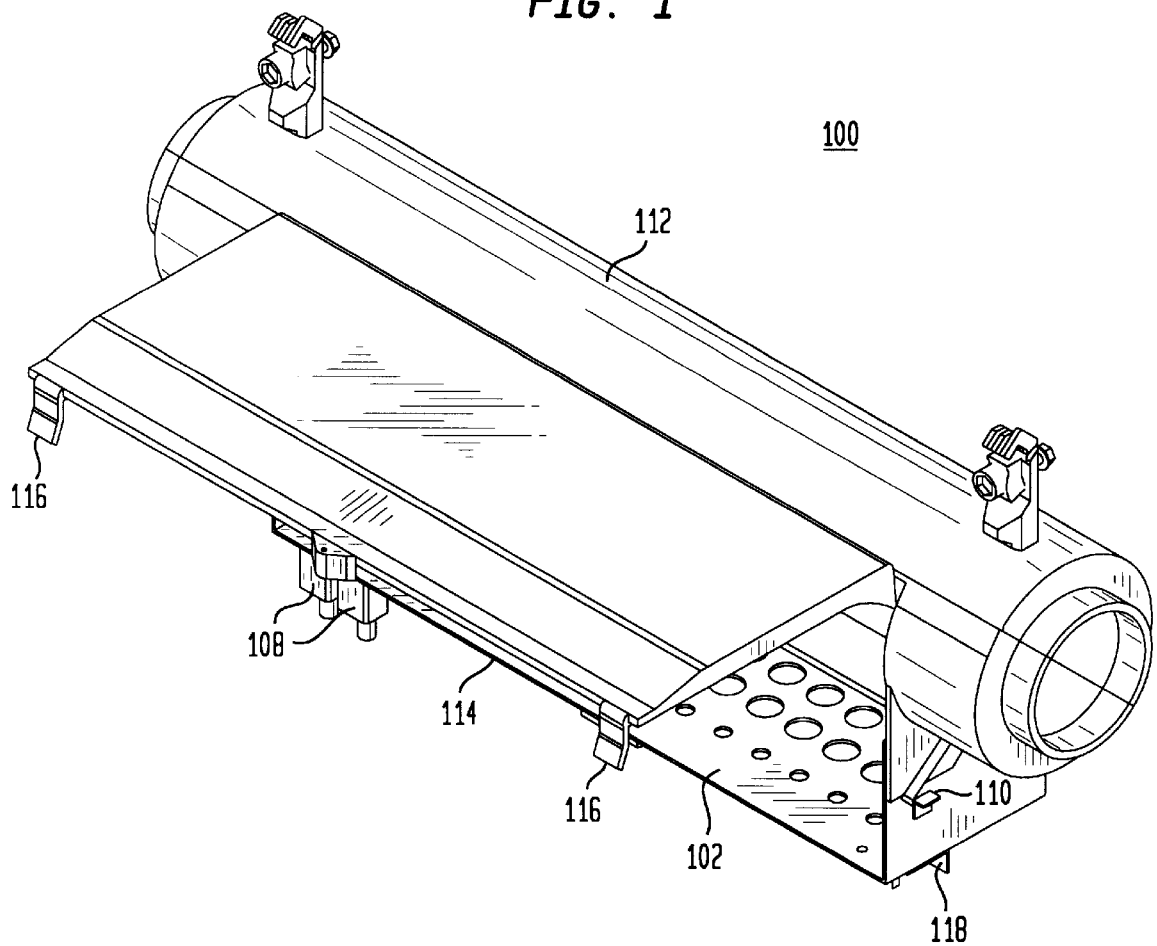
FIGS. 1 and 2 show perspective and end views, respectively, of an aerial terminal, according to one embodiment of the present invention.
Figure 2:
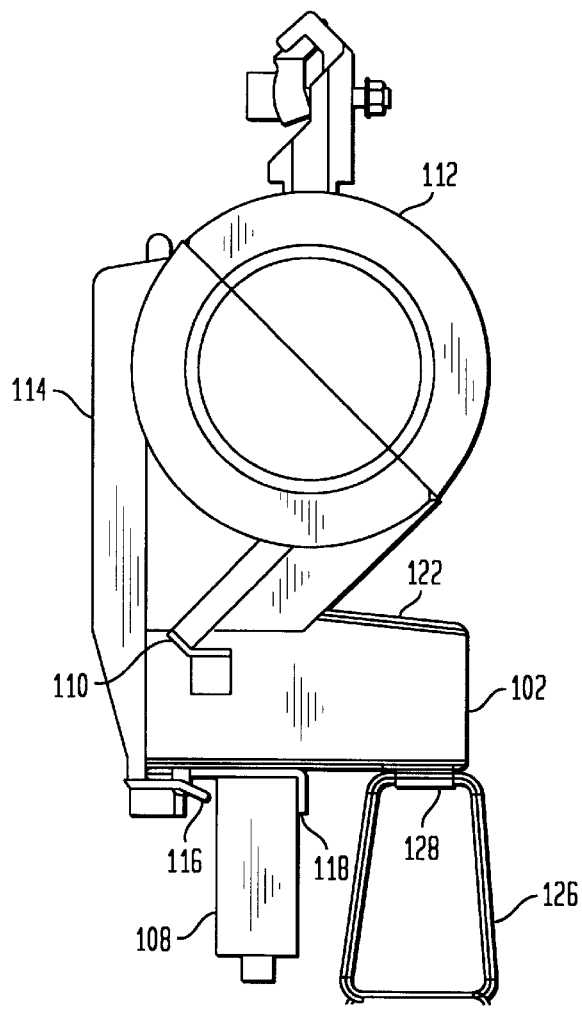

FIGS. 1 and 2 show perspective and end views, respectively, of an aerial terminal 100, according to one embodiment of the present invention. The design of aerial terminal 100 is based on the prior-art Flexterm® 5000 Aerial Terminal sold by Lucent Technologies, Inc., of Murray Hill, N.J. In fact, one of the advantages of this particular embodiment of the present invention is that existing Lucent Flexterm® 5000 Aerial Terminals, even those already installed and in use in the field, can be easily upgraded to aerial terminal 100, without disturbing the connections between the distribution cable and the terminal block of the existing aerial terminal structure. In this embodiment of the present invention, the splice and distribution chambers of aerial terminal 100 are identical to the corresponding chambers of the Lucent Flexterm® 5000 Aerial Terminal. The upgrade is made by replacing the existing grommet tray of the Lucent Flexterm® 5000 Aerial Terminal, which provided holes for passage of individual paired-conductor drop wires running from the terminal block to the customers, with the tray assembly of the present invention.

Figure 3:
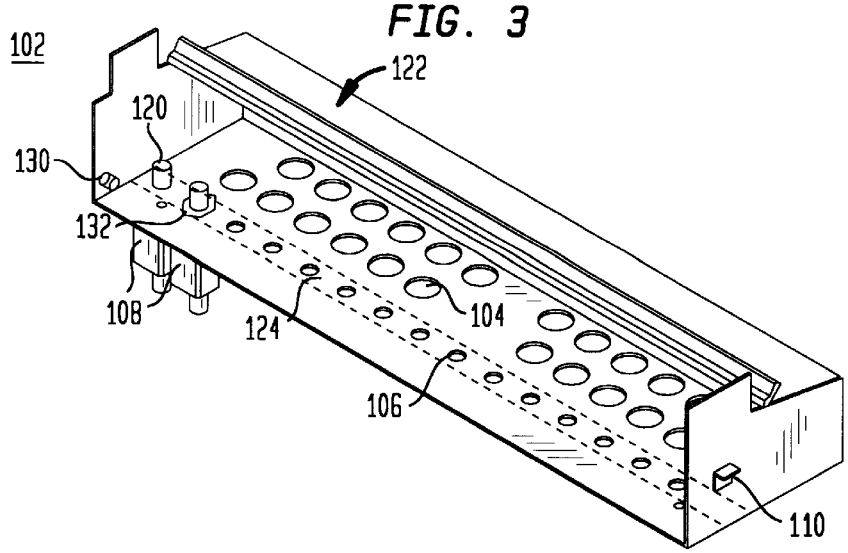
FIG. 3 shows a perspective view of the tray assembly of the aerial terminal of FIGS. 1 and 2.

FIG. 3 shows a perspective view of tray assembly 102 of aerial terminal 100 of FIGS. 1 and 2, according to one embodiment of the present invention. Tray assembly 102 provides a plurality of holes 104 (e.g., 24) for paired-conductor drop wires as well as a plurality of holes 106 (e.g., 16) for installation of baluns 108. A balun allows signals over a twisted pair to be converted and sent through a coaxial-cable drop wire, which is preferred for broadband signals. It will be understood that converters other than baluns could be used to convert the broadband signals. in this particular embodiment, tray assembly 102 enables aerial terminal 100 to be used to distribute to customers up to 40 different communication signals and broadband signals, with up to 16 of the 40 being broadband signals converted by baluns from twisted pairs to coaxial-cable drop wires. Any remaining capacity (i.e., 40 minus the number of installed baluns) can be used for communication signals. In general, the present invention covers aerial terminals that have one or more balun holes for receiving baluns that convert signals from twisted pairs to coaxial-cable drop wires and zero, one, or more additional holes for receiving grommets through which paired-conductor drop wires can be fed.

Tray assembly 102 is designed to replace the grommet trays of existing Lucent Flexterm® 5000 Aerial Terminals. In particular, an existing grommet tray can be removed and a new tray assembly 102 can be installed (using mounting tabs 110), even for those Lucent Flexterm® 5000 Aerial Terminals that are already installed in the field with distribution cables, without having to remove the Lucent Flexterm® 5000 Aerial Terminal and without even having to change any of the connections between the distribution cable and the terminal block.

Tray assembly 102 is designed to operate with the existing hinged doors (114) of the Lucent Flexterm® 5000 Aerial Terminals. When closed, the door 114 snaps (116) into place and a tongue-and-groove seal is formed (a) between the door 114 and the terminal housing 112 and (b) between the door 114 and the tray assembly 102 to inhibit access to the interior of aerial terminal 100 by the elements (e.g., rain, snow, wind) and small animals (e.g., insects, birds, rodents). When open, door 114 pivots about its upper edge and is held open by a spring that "locks" straight to act as a support to provide the user with access to the interior of the distribution chamber of the aerial terminal 100, to enable the routing and termination of paired-conductor drop wires fed up through the tray assembly 102 to the terminal block and of broadband twisted pairs from the baluns 108 to the terminal block.

Paired-conductor drop wires are fed up through grommets (or other appropriate sealing means) inserted within the holes 104 of tray assembly 102 and terminated at the terminal block. Coaxial-cable drop wires are terminated at baluns installed in the balun holes 106 of tray assembly 102 and twisted pairs from those baluns are terminated at the terminal block. The balun holes 106 are preferably sealed with plugs (e.g., plastic or metal) when the holes are not in use.

Tray assembly 102, like the rest of the housing 112 of aerial terminal 100 may be made of metal (e.g., aluminum) or plastic or some other suitable material. If made from plastic or other non-conducting material, a grounding strip preferably runs along either the inside or outside of the balun holes 106. The grounding strip is then connected to an existing ground connection of the aerial terminal to ground the baluns 108. When tray assembly 102 is made from aluminum or other conducting material, a region connecting the balun holes is left unpainted to allow the baluns to be grounded to the conducting tray-assembly material. In FIG. 3, element 124 shown in dashed lines represents the grounding strip when the tray-assembly material is non-conducting. Element 124 also represents the unpainted region when the tray-assembly material is conducting.

Figure 4:
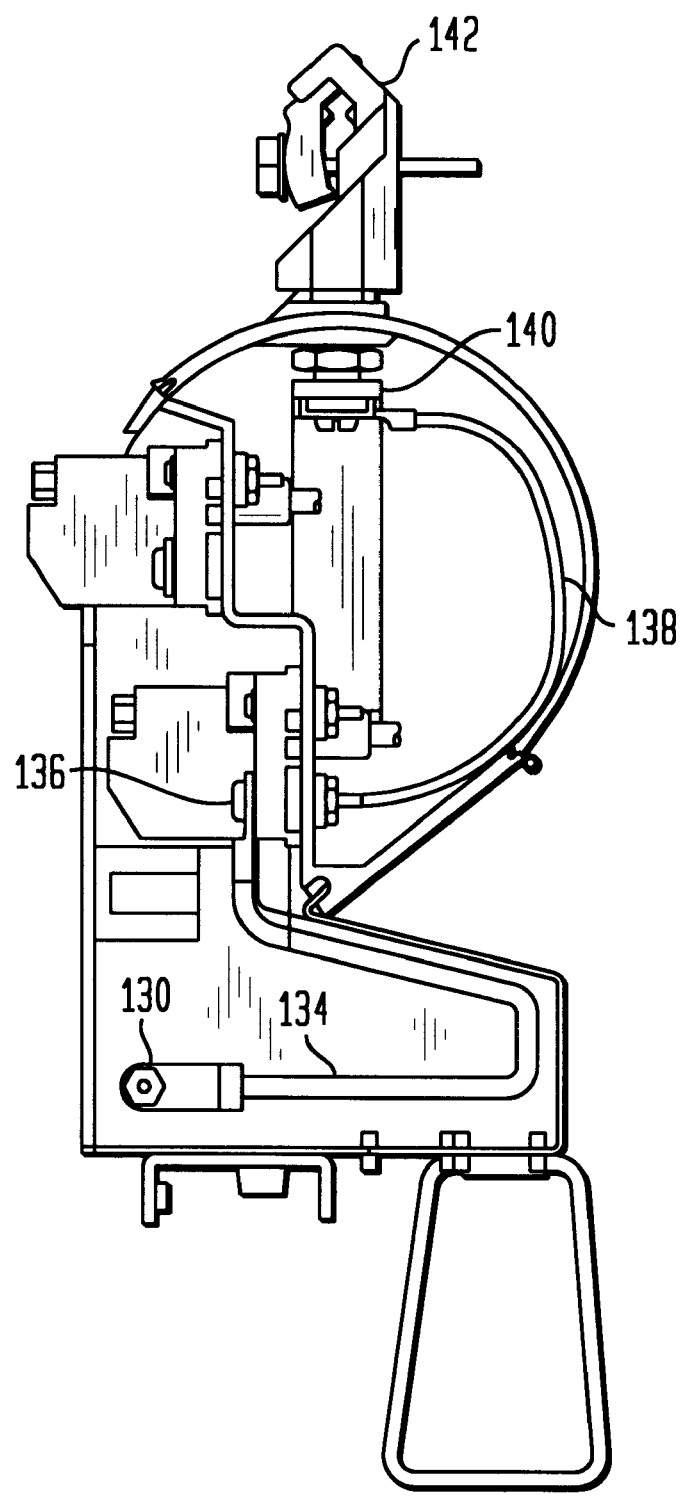
FIG. 4 shows an internal side view of the aerial terminal of FIGS. 1 and 2.

FIG. 4 shows an internal side view of aerial terminal 100 of FIGS. 1 and 2. In particular, FIG. 4 shows a preferred ground path for aerial terminal 100, when tray assembly 102 is made of a conducting material. In that case, referring first to FIG. 3, a ground path runs from each balun 108 to its corresponding balun nut 132 to the unpainted region 124 through the conducting tray-assembly material to a threaded stud 130, which extends from the left wall of the tray assembly 102. The threaded stud 130 is preferably inserted and masked prior to painting to remain unpainted to electrical contact. Referring now to FIG. 4, the ground path continues from the threaded stud 130 to a first ground strap 134 (e.g., #6 gage), which "hugs" the wall of tray assembly 102, to a terminal block screw 136, which helps secure the lower terminal block to the aerial terminal, to a second ground strap 138 to a bond bar 140 and finally to a strand adapter 142, which gets attached to a grounded strand (not shown).

Tray assembly 102 has numerous features that enhance the overall functionality of aerial terminal 100. One such feature is an edge 118 extending vertically from the bottom of tray assembly 102 running next to and parallel to the row of balun holes 106. Edge 118 acts as a rotation stop that aids in the installation of the rectilinear baluns 108. The threaded, twisted-pair end 120 of a balun 108 is inserted through a balun hole 106. The balun 108 is then secured in place by threading a nut 132 over the twisted-pair end from the inside of assembly 102. Edge 118 assists in the balun installation process by providing a rotation stop that keeps the balun 108 from rotating while the nut is tightened over the twisted-pair end, without requiring the user to hold the balun to keep it from rotating.

In an alternative embodiment, each balun hole 106 and the threaded end 120 of each balun 108 have a non-circular profile (e.g., D shaped) that prevents a balun from rotating when inserted in a balun hole. Such a design avoids the need for a separate edge 118 to act as a rotation stop. This, in turn, may decrease the manufacturing cost for the tray assembly.

The balun holes 106 are preferably placed in front of the holes 104 (when viewed from the door side of the aerial terminal) to improve accessibility by the user. It is typically easier to feed paired-conductor drop wires through holes in the back rows than it would be to install baluns in the back rows.

As shown in FIG. 2, the back, top side 122 of the tray assembly is tapered downwards from front to back. This provides two advantages: (1) it allows rain to flow off the aerial terminal away from the electrical connections and (2) it assists during the upward feeding of paired-conductor drop wires through the back-row holes 104 by tending to deflect the wires forward for access by the user.

As shown in FIG. 2, at least one distribution ring 126 hangs from the bottom of the tray assembly 102. Excess length of paired-conductor drop wires and coaxial-cable drop wires is preferably looped through distribution ring 126. In a preferred implementation, distribution ring 126 is tapered (e.g., trapezoidal profile) to be wider at the bottom than at the top. This tapering provides several advantages over prior-art distribution rings which were rectangular in profile.

In order to accommodate coaxial-cable drop wires, which may be wider (and heavier) than conventional paired-conductor drop wires, the internal area of the prior-art distribution rings is preferably increased. This could be done by increasing the height and/or width of the prior-art distribution rings, while retaining their rectangular profile. Distribution rings are typically formed from a single relatively stiff material (e.g., metal wire or plastic) having four right-angle bends and a small opening at the center of the top side. A distribution ring is typically installed onto the aerial terminal by threading one or both sides of the ring opening through a ring retainer 128 located on the bottom of the tray assembly. The ring retainer 128 is either completely or partially bored through and extends for most of the width of the distribution ring.

If a prior-art rectangular distribution ring were made wider to accommodate the wider coaxial-cable drop wires, there would be more play for the distribution ring to slide from side to side within a completely bored-through ring retainer 128, increasing the chances that the distribution ring would inadvertently slip out of the ring retainer. Moreover, a bundle of relatively heavy coaxial cables would tend to exert lateral forces on the sides of a rectangular distribution ring that would tend to force open the ring opening and again increase the chances of the distribution ring falling off the aerial terminal.

By making the distribution ring trapezoidal in shape, the width at the top of the ring can be kept roughly the same as the width of the prior-art rectangular distribution rings. At the same time, the greater width at the bottom of the ring (1) provides more area for the thicker coaxial cables and (2) makes the distribution ring less likely to open even under the weight of the heavier coaxial cables by decreasing the lateral component of force from the drop wires on the sides of the distribution ring as compared to a rectangular ring of the same internal area.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An aerial terminal for distributing one or more drop wires from a distribution cable, comprising:
    (a) a splice chamber adapted to receive the distribution cable;
    (b) a terminal block adapted to receive one or more connections from the distribution cable; and
    (c) a tray assembly having one or more holes adapted to receive one or more paired-conductor drop wires from the terminal block and one or more converter holes each adapted to receive a converter that allows signals over an additional conductor pair to be converted and sent through a coaxial-cable drop wire, wherein each converter is a rectilinear converter and the tray assembly has an edge running along a bottom of the tray assembly adjacent to each converter hole and protruding from the bottom of the tray assembly to inhibit rotation of each rectilinear converter during installation of each rectilinear converter onto the tray assembly.

2. The aerial terminal of claim 1, wherein the tray assembly is made of a non-conducting material and the tray assembly has a grounding strip running along the one or more converter holes for grounding each converter.

3. The aerial terminal of claim 1, wherein the tray assembly is made of a conducting material and the tray assembly has an unpainted region running along the one or more converter holes for grounding each converter.

4. The aerial terminal of claim 1, further comprising a door adapted to seal an interior of the aerial terminal when closed and adapted to provide access to the interior of the aerial terminal when opened.

5. The aerial terminal of claim 1, wherein the one or more converter holes are in front of the one or more holes for the one or more paired-conductor drop wires.

6. The aerial terminal of claim 1, wherein a back top side of the tray assembly is tapered downwards from front to back thereby tending to deflect the one or more paired-conductor drop wires forward during installation.

7. The aerial terminal of claim 1, further comprising a distribution ring connected to a bottom of the aerial terminal and adapted to retain the one or more paired-conductor drop wires, wherein inner and outer dimensions of the distribution ring are wider at a bottom than at a top.

8. The aerial terminal of claim 7, wherein the distribution ring has a trapezoidal profile.

9. The aerial terminal of claim 1, wherein:
    tray assembly is adapted to receive the one or more paired-conductor drop wires carrying communication signals and the coaxial-cable drop wire carrying broadband signals;
    at least one of the one or more converter holes is a balun hole adapted to receive a balun;
    the balun hole is in front of the one or more holes for the one or more paired-conductor drop wires;
    a back top side of the tray assembly is tapered downwards from front to back thereby tending to deflect the one or more paired-conductor drop wires forward during installation; and further comprising:
    a door adapted to seal an interior of the aerial terminal when closed and adapted to provide access to the interior of the aerial terminal when opened; and
    at least one distribution ring connected to a bottom of the aerial terminal and adapted to retain the one or more paired-conductor drop wires, wherein inner and outer dimensions of the distribution ring are wider at a bottom than at a top and the distribution ring has a trapezoidal profile.

10. The aerial terminal of claim 1, wherein each converter hole is a balun hole adapted to receive a balun.

11. The aerial terminal of claim 1, wherein the tray assembly comprises one or more mounting tabs for configuring the tray assembly to the aerial terminal without disturbing any connections between the distribution cable and the terminal block.

12. A tray assembly for an aerial terminal for distributing one or more drop wires from a distribution cable and having a splice chamber adapted to receive the distribution cable and a terminal block adapted to receive one or more connections from the distribution cable, wherein the tray assembly has one or more holes adapted to receive one or more paired-conductor drop wires from the terminal block and one or more converter holes each adapted to receive a converter that allows signals over an additional conductor pair to be converted and sent through a coaxial-cable drop wire, wherein each converter is a rectilinear converter and the tray assembly has an edge running along a bottom of the tray assembly adjacent to each converter hole and protruding from the bottom of the tray assembly to inhibit rotation of each rectilinear converter during installation of each rectilinear converter onto the tray assembly.

13. The tray assembly of claim 12, wherein the tray assembly is made of a non-conducting material and the tray assembly has a grounding strip running along the one or more converter holes for grounding each converter.

14. The tray assembly of claim 12, wherein the tray assembly is made of a conducting material and the tray assembly has an unpainted region running along the one or more converter holes for grounding each converter.

15. The tray assembly of claim 12, further comprising a door adapted to seal an interior of the aerial terminal when closed and adapted to provide access to the interior of the aerial terminal when opened.

16. The tray assembly of claim 12, wherein the one or more converter holes are in front of the one or more holes for the one or more paired-conductor drop wires.

17. The tray assembly of claim 12, wherein a back top side of the tray assembly is tapered downwards from front to back thereby tending to deflect the one or more paired-conductor drop wires forward during installation.

18. The tray assembly of claim 12, further comprising a distribution ring connected to a bottom of the aerial terminal and adapted to retain the one or more paired-conductor drop wires, wherein inner and outer dimensions of the distribution ring are wider at a bottom than at a top.

19. The tray assembly of claim 18, wherein the distribution ring has a trapezoidal profile.

20. The tray assembly of claim 12, wherein:

tray assembly is adapted to receive the one or more paired-conductor drop wires carrying communication signals and the coaxial-cable drop wire carrying broadband signals;

at least one of the one or more converter holes is a balun hole adapted to receive a balun;

the balun hole is in front of the one or more holes for the one or more paired-conductor drop wires;

a back top side of the tray assembly is tapered downwards from front to back thereby tending to deflect the one or more paired-conductor drop wires forward during installation; and further comprising:

a door adapted to seal an interior of the aerial terminal when closed and adapted to provide access to the interior of the aerial terminal when opened; and at least one distribution ring connected to a bottom of the aerial terminal and adapted to retain the one or more paired-conductor drop wires, wherein inner and outer dimensions of the distribution ring are wider at a bottom than at a top and the distribution ring has a trapezoidal profile.

21. The tray assembly of claim 12, wherein each converter hole is a balun hole adapted to receive a balun.

22. The tray assembly of claim 12, wherein the tray assembly comprises one or more mounting tabs for configuring the tray assembly to the aerial terminal without disturbing any connections between the distribution cable and the terminal block.

23. An aerial terminal for distributing one or more drop wires from a distribution cable, comprising:

(a) a splice chamber adapted to receive the distribution cable;

(b) a terminal block adapted to receive one or more connections from the distribution cable; and (c) a tray assembly having one or more holes adapted to receive one or more paired-conductor drop wires from the terminal block and one or more converter holes each adapted to receive a converter that allows signals over an additional conductor pair to be converted and sent through a coaxial-cable drop wire, wherein a back top side of the tray assembly is tapered downwards from front to back thereby tending to deflect the one or more paired-conductor drop wires forward during installation.

24. The aerial terminal of claim 23, wherein the tray assembly comprises one or more mounting tabs for configuring the tray assembly to the aerial terminal without disturbing any connections between the distribution cable and the terminal block.

25. A tray assembly for an aerial terminal for distributing one or more drop wires from a distribution cable and having a splice chamber adapted to receive the distribution cable and a terminal block adapted to receive one or more connections from the distribution cable, wherein the tray assembly has one or more holes adapted to receive one or more paired-conductor drop wires from the terminal block and one or more converter holes each adapted to receive a converter that allows signals over an additional conductor pair to be converted and sent through a coaxial-cable drop wire, wherein a back top side of the tray assembly is tapered downwards from front to back thereby tending to deflect the one or more paired-conductor drop wires forward during installation.

26. The tray assembly of claim 25, wherein the tray assembly comprises one or more mounting tabs for configuring the tray assembly to the aerial terminal without disturbing any connections between the distribution cable and the terminal block.

27. An aerial terminal for distributing one or more drop wires from at least one distribution cable, comprising:

(a) a splice chamber adapted to receive the distribution cable;

(b) a terminal block adapted to receive one or more connections from the at least one distribution cable; and (c) a tray assembly having one or more holes adapted to receive one or more paired-conductor drop wires from the terminal block and one or more converter holes each adapted to receive a converter that allows signals over an additional conductor pair which is twisted to be converted and sent through a coaxial-cable drop wire, wherein the tray assembly is made of a conducting material and the tray assembly has an unpainted region running along the one or more converter holes for grounding the one or more converters.

28. A tray assembly for an aerial terminal for distributing one or more drop wires from at least one distribution cable and having a splice chamber adapted to receive the distribution cable and a terminal block adapted to receive one or more connections from the distribution cable, wherein the tray assembly has one or more holes adapted to receive one or more paired-conductor drop wires from the terminal block and one or more converter holes each adapted to receive a converter that allows signals over an additional conductor pair which is twisted to be converted and sent through a coaxial-cable drop wire, wherein the tray assembly is made of a conducting material and the tray assembly has an unpainted region running along the one or more converter holes for grounding the one or more converters.

* * * * *